US009566960B2

(12) United States Patent
Feigel (10) Patent No.: US 9,566,960 B2
(45) Date of Patent: Feb. 14, 2017

(54) METHOD FOR OPERATING A BRAKE SYSTEM FOR MOTOR VEHICLES, AND BRAKE SYSTEM

(71) Applicant: Continental Teves AG & Co. oHG, Frankfurt (DE)

(72) Inventor: Hans-Jörg Feigel, Rosbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 233 days.

(21) Appl. No.: 14/382,884

(22) PCT Filed: Mar. 5, 2013

(86) PCT No.: PCT/EP2013/054354
§ 371 (c)(1),
(2) Date: Sep. 4, 2014

(87) PCT Pub. No.: WO2013/131887
PCT Pub. Date: Sep. 12, 2013

(65) Prior Publication Data
US 2015/0025767 A1    Jan. 22, 2015

(30) Foreign Application Priority Data

Mar. 6, 2012 (DE) .......................... 10 2012 203 492
Mar. 4, 2013 (DE) .......................... 10 2013 203 594

(51) Int. Cl.
*B60T 8/17* (2006.01)
*B60T 13/68* (2006.01)
(Continued)

(52) U.S. Cl.
CPC .. *B60T 8/17* (2013.01); *B60T 8/36* (2013.01); *B60T 8/3655* (2013.01); *B60T 8/4081* (2013.01); *B60T 13/68* (2013.01)

(58) Field of Classification Search
USPC .......................................................... 701/70
See application file for complete search history.

(56) References Cited

U.S. PATENT DOCUMENTS 5,234,261 A    8/1993  Leyes
5,433,512 A *  7/1995  Aoki .......................... B60L 7/10
                                                           180/165
(Continued)

FOREIGN PATENT DOCUMENTS

CN    1235914    11/1999
DE    3716515    11/1988
(Continued)

OTHER PUBLICATIONS

Kunz, WO2011/104090 A1 Written Description, EPO English translation Jun. 28, 2016.*
(Continued)

*Primary Examiner* — Courtney Heinle
*Assistant Examiner* — Kevin P Mahne
(74) *Attorney, Agent, or Firm* — RatnerPrestia (57) ABSTRACT

A method and system for operating a motor vehicle brake system, including several wheel brakes, an electrically controllable pressure supply device, dispenses a pressure medium volume for actuating the brakes, and an analogized or analog-controlled inlet valve, arranged in each wheel brake between the pressure supply device and wheel brake, for adjusting wheel-individual brake pressures. A check valve is connected in parallel to each inlet valve. At the start of a wheel-individual brake pressure control, all inlet valves are closed, and a pressure build-up is carried out in a predetermined group of one or more wheel brakes by displacing a pressure medium volume into the predetermined group of wheel brakes by the pressure supply device. Each inlet valve of the predetermined group is controlled such that the inlet valve is overflowed, wherein each inlet (Continued)

valve of the remaining wheel brakes is controlled such that the inlet valve remains closed.

14 Claims, 6 Drawing Sheets

(51) Int. Cl.
*B60T 8/36* (2006.01)
*B60T 8/40* (2006.01)

(56) References Cited

U.S. PATENT DOCUMENTS

| | | | |
|---|---|---|---|
| 5,934,767 A | 8/1999 | Schmidt | |
| 6,027,182 A * | 2/2000 | Nakanishi | B60T 7/042 188/356 |
| 6,076,897 A * | 6/2000 | Binder | B60T 7/042 303/115.4 |
| 6,193,330 B1 | 2/2001 | Soga | |
| 7,976,108 B2 | 7/2011 | Mori | |
| 2003/0098613 A1 | 5/2003 | Bohm | |
| 2004/0080208 A1* | 4/2004 | Giers | B60T 8/36 303/20 |
| 2008/0296967 A1 | 12/2008 | Mori | |
| 2010/0114419 A1* | 5/2010 | Tanaka | B60T 8/4081 701/31.4 |
| 2012/0013173 A1 | 1/2012 | Leiber | |
| 2012/0169112 A1 | 7/2012 | Jungbecker | |
| 2013/0057052 A1* | 3/2013 | Kunz | B60T 8/267 303/3 |
| 2013/0119752 A1 | 5/2013 | Roll | |
| 2013/0207452 A1 | 8/2013 | Gilles | |

FOREIGN PATENT DOCUMENTS

| | | |
|---|---|---|
| DE | 102010020002 | 11/2011 |
| DE | 102011077329 | 1/2012 |
| EP | 1039134 | 9/2000 |
| EP | 1852324 | 11/2007 |
| EP | 1997701 | 12/2008 |
| EP | 2103493 | 9/2009 |
| JP | 10230828 | 9/1998 |
| JP | 11235975 | 8/1999 |
| JP | 2008296884 | 12/2008 |
| WO | 9723372 | 7/1997 |
| WO | 0198124 | 12/2001 |
| WO | 2010091883 | 8/2010 |
| WO | 2011029812 | 3/2011 |
| WO | WO2011/104090 A1 * | 9/2011 ............... B60T 8/26 |

OTHER PUBLICATIONS

International Search Report for PCT/EP/054354 mailed May 24, 2013.
German Search Report mailed Oct. 30, 2013 in counterpart German Application No. 10 2013 203 594.2, including partial translation.
Written Opinion of the International Searching Authority for International Application No. PCT/EP2013/054354.

* cited by examiner

METHOD FOR OPERATING A BRAKE SYSTEM FOR MOTOR VEHICLES, AND BRAKE SYSTEM

CROSS REFERENCE TO RELATED APPLICATIONS

This application is the U.S. National Phase Application of PCT International Application No. PCT/EP2013/054354, filed Mar. 5, 2013, which claims priority to German Patent Application No. 10 2012 203 492.7, filed Mar. 6, 2012 and German Patent Application No. 10 2013 203 594.2, filed Mar. 4, 2013, the contents of such applications being incorporated by reference herein.

FIELD OF THE INVENTION

The invention relates to a method for operating a brake system and to a brake system.

BACKGROUND OF THE INVENTION

In automotive technology "brake-by-wire" brake systems are being used increasingly widely. Such brake systems often include, in addition to a brake master cylinder which can be actuated by the vehicle driver, an electrically controllable pressure supply device by means of which actuation of the wheel brakes or of the brake master cylinder takes place in the brake-by-wire operating mode. In order to communicate an agreeable pedal feel to the vehicle driver in the brake-by-wire operating mode, the brake systems usually include a brake pedal feel simulator. In these brake systems the wheel brakes can also be actuated on the basis of electronic signals without active intervention by the vehicle driver. These electronic signals may be output, for example, by an electronic stability program or a distance control system.

A brake-by-wire brake system comprising a brake master cylinder actuable by the brake pedal, a travel simulator and a pressure supply device is known from the international patent application WO 2011/029812 A1, which is incorporated by reference. In a brake-by-wire operating mode the wheel brakes are subjected to pressure by the pressure supply device. In a fallback operating mode the wheel brakes are subjected to pressure by means of the brake master cylinder actuable by the brake pedal. For each wheel brake the brake system includes an inlet valve and an outlet valve for adjusting wheel-individual brake pressures. A method for activating these valves is not described.

WO 2010091883 A1, which is incorporated by reference, discloses a brake system having a brake booster the piston-cylinder system of which is driven mechanically by an electric motor, a single 2/2-way switching valve, a so-called multiplex valve, being provided for adjusting a wheel-individual brake pressure. With the multiplex method, pressure is adjusted sequentially at the individual wheel brakes, the pressure adjustment being effected by the forward and return stroke of the piston of the piston-cylinder system. Here, the not inconsiderable noise generation is considered disadvantageous, which noise results inter alia from the fact that, firstly, the electric motor has to execute high-frequency reversing operations of the piston-cylinder system and, secondly, the multiplex valves have to be closed and opened in rapid succession, causing impact noises inside the multiplex valves.

SUMMARY OF THE INVENTION

An aspect of the present invention provides a method for operating a brake system, and a brake system, which make possible finely-metered control of the brake pressures of the wheel brakes with a noise generation as low as possible.

An aspect of the invention is based on the idea that, at the start of a wheel-individual brake pressure control process, all the inlet valves are closed, and that a pressure build-up to a predetermined pressure value in a predefined group of one or more wheel brakes is carried out by displacing a pressure medium volume into the predefined group of wheel brakes by means of a pressure supply device, each inlet valve of the one or more wheel brakes of the predefined group being activated in such a way that the inlet valve is overflowed, and each inlet valve of the remaining wheel brakes not belonging to the predefined group being activated in such a way that the inlet valve remains closed.

An advantage of the invention is that the impact noises of the inlet valves are significantly reduced, since the inlet valves are continuously closed and are only overflowed during the pressure build-up. There is no impact against the rear stop as the inlet valves are opened, and the overflowed inlet valves close slowly and with little force as the pressure build-up ends.

The inlet valves are analogized or analog-controlled inlet valves which in each case are activated by an electrical activation quantity. The inlet valves are preferably actuated by means of an activation current. In the unactivated state the inlet valves are open (for example, are of currentlessly open configuration). Thus, by appropriate selection of the value of the activation quantity, it can be predetermined whether or at which pressure of the pressure supply device a closed inlet valve can, or cannot, be overflowed by means of the pressure supply device. More precisely, the force acting on the valve piston, which force itself defines the overflow pressure required to open the inlet valve, is determined by the value (magnitude) of the electrical activation quantity supplied to the inlet valve.

For an activation of the inlet valves as accurate as possible, an activation characteristic, which describes a dependence of the electrical activation quantity on a differential pressure or pressure acting on the inlet valve, is preferably predetermined for each inlet valve. The activation characteristics may be determined at the factory and stored in an electronic control and regulation unit, for example of the brake system. Especially preferably, the activation characteristics of the individual inlet valves are measured by means of the pressure supply device during operation of the vehicle and stored in the electronic control and regulation unit so as to be available for pressure regulation.

The brake system preferably includes one outlet valve per wheel brake. By means of the outlet valves, requirements for pressure reduction in one or more wheel brakes can be met independently of one another and simultaneously with a pressure build-up in another wheel. The outlet valves advantageously connect the wheel brakes to a pressure medium reservoir. Especially preferably, the outlet valves are configured to be currentlessly closed, that is, are in a blocked state in the unactivated state.

The pressure medium volume to be displaced into the predefined group by the pressure supply device in order to build up pressure to a predetermined pressure value is preferably determined with reference to the pressure-volume relationship or relationships and to the reference pressure or pressures of the one or more wheel brakes of the predefined group. Especially preferably, the pressure medium volume to be displaced is equal to the wheel take-up volume of the single wheel brake of the predefined group or to the sum of the wheel take-up volumes of the plurality of wheel brakes of the predefined group. Each wheel take-up volume is determined, with reference to the predetermined pressure value, from the pressure-volume relationship of the corresponding wheel brake.

According to a development of the invention, the displacement of the pressure medium volume is effected by a volume control or position control (travel control) of the pressure supply device. The control is advantageously carried out while taking account of the pressure-volume relationship(s) and of the reference pressure(s) of the one or more wheel brakes of the predefined group.

In order to build up the pressures in the wheel brakes to the desired, wheel-individual reference pressures, a pressure build-up is carried out successively in time in different groups of one or more wheel brakes. For this purpose different groups of one or more wheel brakes are allocated to the predefined group in successive time intervals and a pressure build-up is carried out by overflowing the inlet valves of the wheel brakes of the respective predefined group.

If the pressure at the one or more wheel brakes of the predefined group is to be built up to a predetermined final pressure, the one or more inlet valves of these wheel brakes of the predefined group are preferably each activated with an activation quantity the value of which has at least a threshold value which corresponds to the differential pressure between the predetermined final pressure and the lowest actual pressure in one of the other wheel brakes which do not belong to the predefined group. Through the selection of the value of the activation quantity which has been described, it is ensured that the inlet valve or valves of the predefined group are closed.

It is further preferred that the activation quantity exceeds the respective threshold value by not more than a predetermined amount, in order to ensure easy overflowing of the inlet valve by the pressure supply device.

For each inlet valve a threshold value corresponding to the differential pressure is preferably determined from the predefined activation characteristic of the inlet valve. The closing characteristic of the inlet valve is especially preferably specified for this purpose.

In order to carry out a pressure build-up to different, wheel-individual reference pressures in a group of two or more predetermined wheel brakes, the following procedure is preferably adopted. First, all the predetermined wheel brakes are allocated to the predefined group and a simultaneous pressure build-up to the lowest reference pressure of the reference pressures of the predetermined wheel brakes is carried out by overflowing the inlet valves of the wheel brakes of the predefined group. Once the corresponding predefined pressure medium volume has been displaced into the predefined group, each inlet valve of the wheel brakes of the predefined group having a reference pressure which corresponds to the lowest reference pressure is activated in such a way that the inlet valve is no longer overflowed. The predetermined wheel brakes having a reference pressure which is higher than the lowest reference pressure are then allocated to the (new) predefined group and in this (new) predefined group a pressure build-up to the next-higher reference pressure is carried out by overflowing the inlet valves of the corresponding wheel brakes.

According to a development of the invention, the brake system pressure provided by the pressure supply device is determined and used for monitoring.

The pressure supply device is preferably activated or adjusted in such a way that the brake system pressure made available by the pressure supply device is always higher than the highest pressure in any of the wheel brakes. Pressure medium is thereby prevented from escaping from the wheel brakes via the non-return valves.

The method is preferably carried out in a brake system having two or more brake circuits in which each brake circuit is connected, via a hydraulic connecting line having an, advantageously currentlessly open, isolation valve, to a brake master cylinder and, via a further hydraulic connecting line having an, advantageously currentlessly closed, sequence valve, to the pressure supply device.

The pressure medium volume delivered by the pressure supply device is preferably determined and monitored by means of a travel detection device or a position detection device arranged on or in the pressure supply device.

The invention also relates to a brake system in which a method according to the invention is carried out.

The pressure supply device of the brake system is preferably formed by a cylinder-piston arrangement, the piston of which can be actuated by an electromechanical actuator. In this case the pressure medium volume delivered or taken up by the pressure supply device is advantageously determined by means of a travel detection device or a position detection device which determines a quantity characterizing a position or location of the piston.

Alternatively, it is preferred that the pressure supply device is formed by a dual-piston or multi-piston pump which includes a pump position sensor.

The brake system preferably includes a pressure sensor for detecting the brake system pressure delivered by the pressure supply device.

The brake system is preferably a brake system for motor vehicles which, in a so-called brake-by-wire operating mode, can be activated both by the vehicle driver and independently of the vehicle driver, is operated preferably in the brake-by-wire operating mode and can be operated in at least one fallback operating mode in which only operation by the vehicle driver is possible.

BRIEF DESCRIPTION OF THE DRAWINGS

Further preferred embodiments of the invention are apparent from the dependent claims and from the description with reference to figures, in which:

DETAILED DESCRIPTION OF THE PREFERRED EMBODIMENTS

Figure 1:
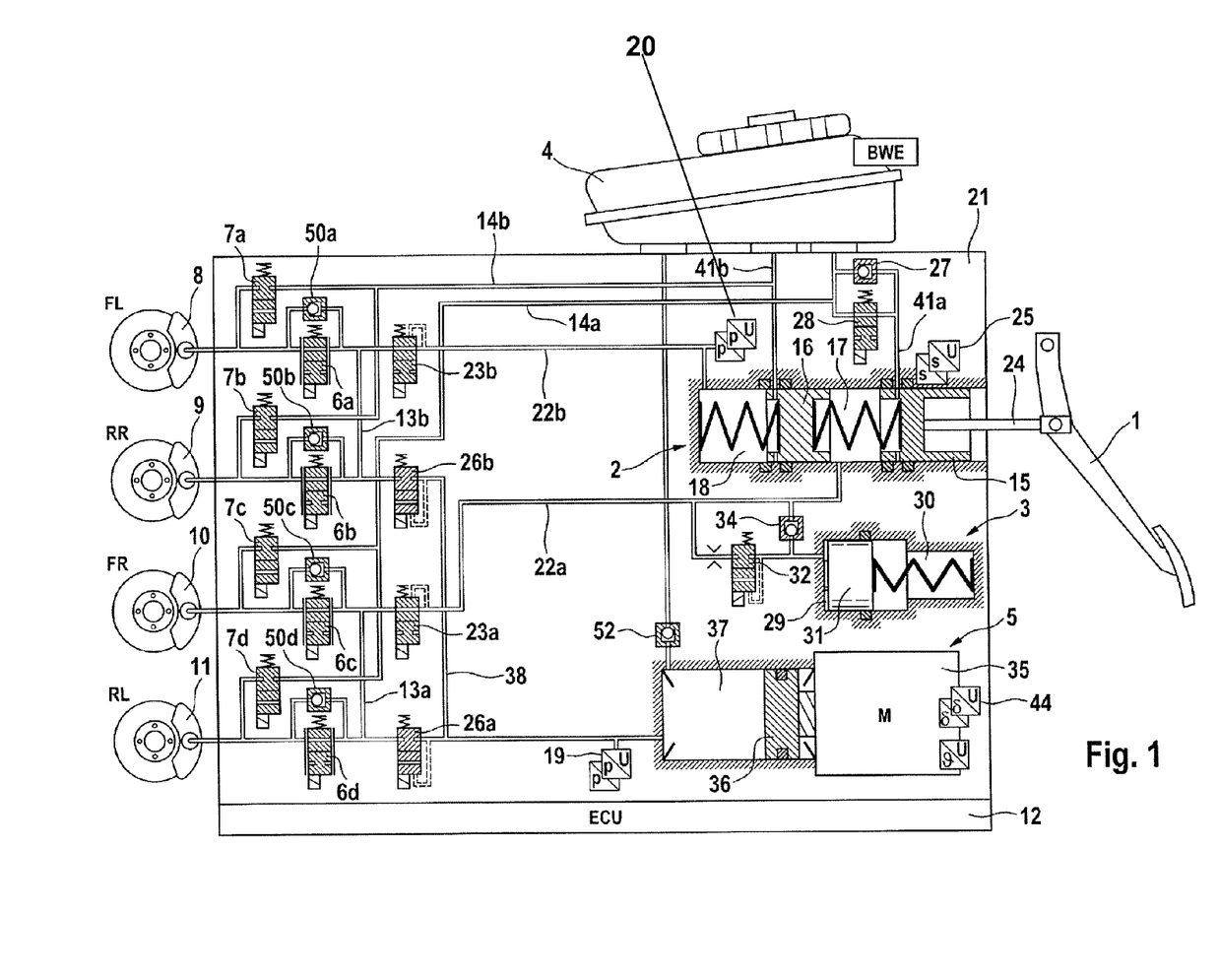
FIG. 1 shows schematically an exemplary brake system for carrying out a method according to the invention.

FIG. 1 shows an exemplary brake system for carrying out a method according to the invention in a schematic representation. The brake system comprises essentially a hydraulic actuating unit 2 which can be actuated by means of an actuating or brake pedal 1, a travel simulator or simulation device 3 cooperating with the hydraulic actuating unit 2, a pressure medium reservoir 4 under atmospheric pressure and associated with the hydraulic actuating unit 2, an electrically controllable pressure supply device 5, an electronic control and regulation unit 12 and an electrically controllable pressure modulation arrangement.

In the example, the pressure modulation arrangement comprises, for each wheel brake 8, 9, 10, 11 of a motor vehicle (not shown), an inlet valve 6a-6d and an outlet valve 7a-7d which are coupled hydraulically in pairs via central connections and are connected to the wheel brakes 8, 9, 10, 11. The inlet ports of the inlet valves 6a-6d are supplied, by means of brake circuit supply lines 13a, 13b, with pressures derived, in a brake-by-wire operating mode, from a brake system pressure which is present in a system pressure line 38 connected to a pressure chamber 37 of the electrically controllable pressure supply device 5. In a fallback operating mode the brake circuit supply lines 13a, 13b are supplied, via hydraulic lines 22a, 22b, with the pressures of the pressure chambers 17, 18 of the actuating unit 2. The outlet ports of the outlet valves 7a-7d are connected in pairs via return lines 14a, 14b to the pressure medium reservoir 4. In the example, the two brake circuits are split diagonally. The first brake circuit (13a) comprises the front right 10 (FR) and rear left 11 (RL) wheel brakes, and the second brake circuit (13b) the front left 8 (FL) and rear right 9 (RR) wheel brakes.

For safety reasons, since it must be possible to release the pressure in the wheel brakes 8-11 under all circumstances, a respective non-return valve 50a-50d opening towards the brake circuit supply lines 13a, 13b is connected in parallel to each of the inlet valves 6a-6d. The non-return valves 50a-50d ensure that no wheel brake pressure is ever higher than the pressure of the pressure supply device 5. Thereby—unlike the case with a brake system having multiplex valves—a wheel brake pressure cannot be lowered by means of a pressure drop of the pressure supply device without all the wheel brake pressures also being immediately lowered.

The hydraulic actuating unit 2 has in a housing 21 two pistons 15, 16 arranged one behind the other which delimit hydraulic chambers or pressure chambers 17, 18 which, together with the pistons 15, 16, form a dual circuit brake master cylinder or tandem master cylinder. The pressure chambers 17, 18 are connected, on the one hand, via radial bores formed in the pistons 15, 16 and corresponding pressure compensation lines 41a, 41b, to the pressure medium reservoir 4, the pressure compensation lines 41a, 41b being blockable by a relative movement of the pistons 17, 18 in the housing 21, and, on the other hand, are connected by means of the hydraulic lines 22a, 22b, to the aforementioned brake circuit supply lines 13a, 13b, via which the inlet valves 6a-6d are connected to the actuating unit 2. The pressure compensation line 41a includes a parallel coupling of a currentlessly open (SO) diagnostic valve 28 to a non-return valve 27 closing towards the pressure medium reservoir 4. A piston rod 24 couples the swiveling movement of the brake pedal 1 resulting from a pedal actuation to the translational movement of the first (master cylinder) piston 15, the actuation travel of which is detected by a travel sensor 25 which is preferably implemented redundantly. The corresponding piston travel signal is therefore a measure for the brake pedal actuation angle. It represents a braking request of a vehicle driver.

A respective isolation valve 23a, 23b, in the form of an electrically actuable, preferably currentlessly open (SO) valve in each case, is arranged in the line sections 22a, 22b connected to the pressure chambers 17, 18. By means of the isolation valves 23a, 23b the hydraulic connection between the pressure chambers 17, 18 and the brake circuit supply lines 13a, 13b can be shut off, for example in the normal braking function brake-by-wire operating mode. A pressure sensor 20 connected to the line section 22b detects the pressure built up in the pressure chamber 18 by a displacement of the second piston 16.

The travel simulator 3 is coupled hydraulically to the brake master cylinder 2 and consists essentially of a simulator chamber 29, a simulator spring chamber 30 and a simulator piston 31 separating the two chambers 29, 30 from one another. The simulator piston 31 bears, via an elastic element (for example, a spring) which is preferably pretensioned and is arranged in the simulator spring chamber 30, against the housing 21. The simulator chamber 29 is connectable by means of an electrically actuable simulator release valve 32 to the first pressure chamber 17 of the tandem brake master cylinder 2. Upon exertion of a pedal force and with the simulator release valve 32 activated, pressure medium flows from the brake master cylinder pressure chamber 17 into the simulator chamber 29. A non-return valve 34 arranged hydraulically in anti-parallel to the simulator release valve 32 makes it possible for the pressure medium to flow back largely unimpeded from the simulator chamber 29 to the brake master cylinder pressure chamber 17 regardless of the switching state of the simulator release valve 32.

The electrically controllable pressure supply device 5 is in the form of a hydraulic cylinder-piston arrangement or a single-circuit electrohydraulic actuator, the piston 36 of which is actuable by a schematically indicated electric motor 35 via an interposed rotation-translation gear, also indicated schematically. The piston 36 delimits a pressure chamber 37. Feeding of pressure medium into the pressure chamber 37 is possible through a retraction of the piston 36 with the sequence valves 26a, 26b closed, pressure medium being able to flow from the pressure medium reservoir 4, via a feed valve 52 in the form of a non-return valve opening in the flow direction to the actuator, into the actuator pressure chamber 37.

In order to determine a quantity s characteristic of the position/location of the piston 36 of the pressure supply device 5, a sensor 44, which in the example is in the form of a rotor position sensor serving to detect the rotor position of the electric motor 35, is present. Other sensors are also possible, for example a travel sensor for detecting the position/location of the piston 36. With reference to the quantity characteristic of the position/location of the piston 36, it is possible to determine the pressure medium volume V delivered or taken up by the pressure supply device 5. In order to determine the pressure P generated by the pressure supply device 5, a pressure sensor 19, preferably implemented redundantly, is provided.

Figure 2:
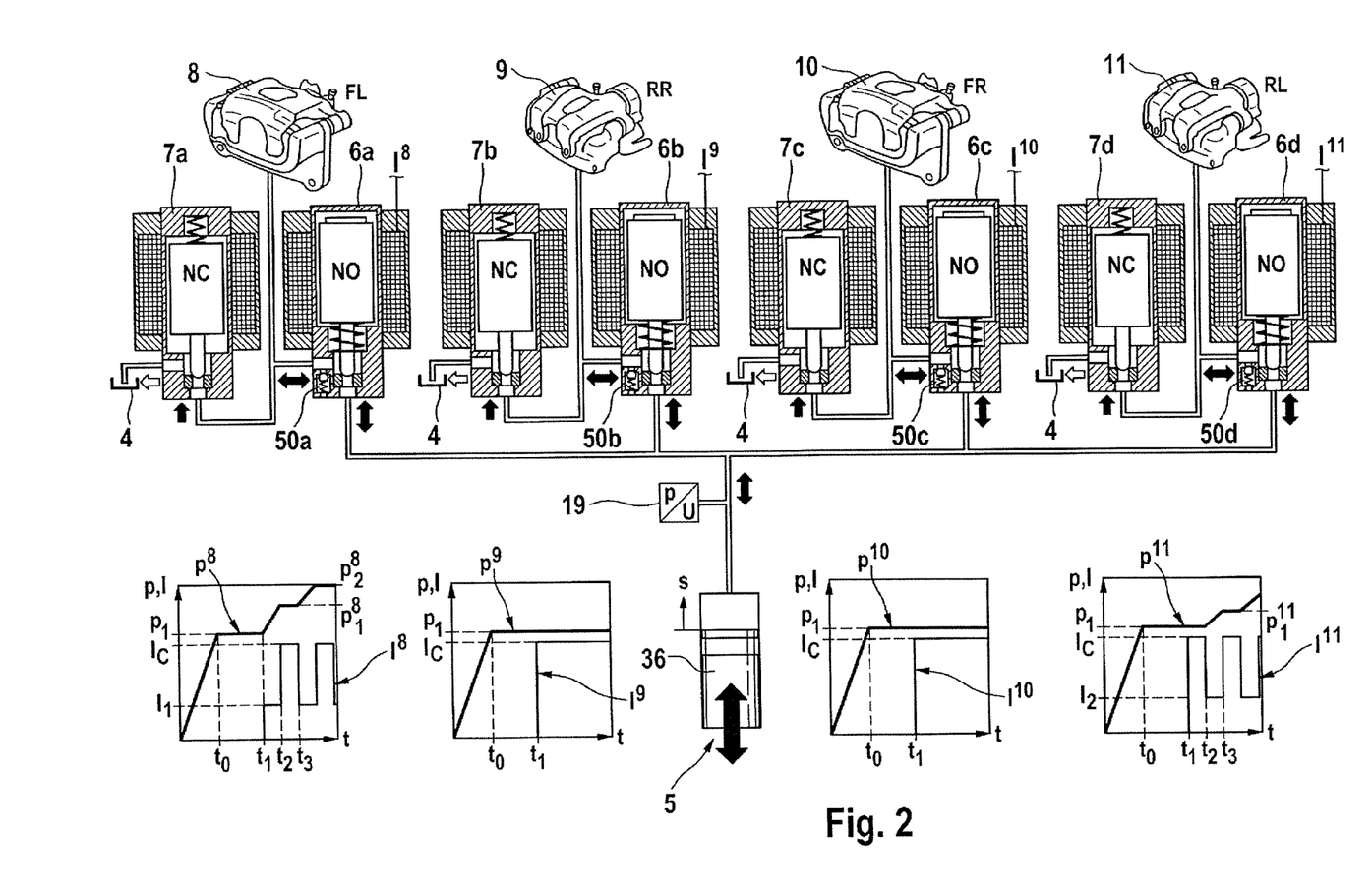
FIG. 2 shows schematically a detail of the exemplary brake system of FIG. 1 to clarify a first exemplary embodiment of a method according to the invention.

In FIG. 2 a detail of the exemplary brake system of FIG. 1 is represented schematically in order to clarify a first exemplary embodiment of a method according to the invention. The pressure supply device 5 with piston 36, the pressure sensor 19 for determining the brake system pressure P of the pressure supply device, the wheel brakes FL, RR, FR, RL or 8, 9, 10, 11, the inlet valves 6a-6d with non-return valves 50a-50d which are connected in parallel and are each arranged in the hydraulic connection between pressure supply device 5 and inlet valve, and the outlet valves 7a-7d, which are arranged in the respective hydraulic connection between wheel brake and pressure medium reservoir, are shown. In addition, graphs with the respective progression over time of the activation quantity I of the inlet valves 6a, 6b, 6c, 6d, denoted by $I^8$, $I^9$, $I^{10}$, $I^{11}$, and of the wheel brake pressure p of the individual wheel brakes 8, 9,

10, 11, which are denoted by $p^8$, $p^9$, $p^{10}$, $p^{11}$, are shown below the respective wheel brakes 8, 9, 10, 11. In the example, the inlet valves are activated with a current, for which reason the term activation current I is used hereinafter.

From the time $t=0$ to the time $t=t_0$ the brake pressure in all wheel brakes 8, 9, 10, 11 is built up jointly and simultaneously from zero to a value $P_1$ by the pressure supply device, and then held constant at the pressure level $P_1$ until the time $t=t_1$. In the example, therefore, the starting point is a pressure $P_1$ which is initially equal in all the wheel brakes 8, 9, 10, 11 and is equal to the pressure of the pressure supply device 5. Then, a brake pressure build-up to different reference pressures is to be carried out at the wheel brakes 8 and 11, while the pressure in the wheel brakes 9 and 10 is to be maintained (reference pressures $p^9_{soll}=p^{10}_{soll}=P_1$). These wheel-individual reference pressures or reference pressure curves over time $p^n_{soll}$ (n=8, 9, 10 or 11) for the wheel brakes 8, 9, 10, 11 are predetermined by a control function of the brake system (for example, an anti-lock function (ABS: Anti-Lock Braking System), a dynamic control function (ESC: Electronic Stability Control), a distance control function (ACC: Active Cruise Control), and the like.

At the start of the wheel-individual brake pressure control process at time $t_1$, all the inlet valves 6a, 6b, 6c, 6d are closed, that is, are activated with an activation current greater than zero. According to the first exemplary embodiment of a method according to the invention, the pressure build-up at the two wheel brakes 8 and 11 is carried out sequentially, that is, a pressure build-up is first carried out only at wheel brake 8 ("active" wheel brake or first predefined (selected) group $A_1$ of wheel brakes), then a pressure build-up is carried out only at wheel brake 11 (next "active" wheel brake or second predefined group $A_2$), then a pressure build-up is again carried out only at wheel brake 8 (third predefined group $A_3$), etc. That is to say that the pressure build-up phases of the predefined groups $A_1, A_2, A_3, \ldots$ are carried out sequentially.

Because a pressure build-up is to be carried out first at wheel brake 8, wheel brake 8 is the single member of the first predefined group $A_1$ of wheel brakes. At time $t_1$ (up to time $t_2$) the inlet valves 6b, 6c, 6d of the wheel brakes 9, 10, 11 which do not belong to group $A_1$ are activated in such a way that the inlet valves 6b, 6c, 6d are closed and cannot be overflowed. The corresponding activation currents $I^9$, $I^{10}$, $I^{11}$ are therefore set to a current value $I_c$ which ensures that the inlet valves 6b, 6c, 6d remain closed. The inlet valve 6a of wheel brake 8 of the first predefined group $A_1$ is activated in such a way that the inlet valve 6a is closed but can be overflowed by means of the pressure supply device 5. The activation current $I^8$ is therefore set to a current value $I_1$ which is lower than the value $I_c$. The inlet valve 6a is subjected to at least the current value (threshold value $I_{grenz}$ which corresponds to the differential pressure between the reference pressure $p^8_1$, to which the wheel brake pressure is to be increased, and the lowest known wheel brake pressure in a different wheel brake circuit, in this case $P_1$. The threshold value may be determined, for example, with reference to the predefined closing characteristic of the inlet valve. The current value $I_1$ set at inlet valve 6a is therefore greater or equal to the valve-dependent threshold value $I_{grenz}$ ($I_1 \geq I_{grenz}$) However, the activation current value $I_1$ is also selected to be not significantly higher than this minimum value $I_{grenz}$, so that overflowing of the valve 6a is easily possible.

The pressure build-up in wheel brake 8 to the predetermined reference pressure value $p^8_1$ is effected by displacing a pressure medium volume $V_A$ into the predefined group $A_1$, that is, into wheel brake 8, by means of the pressure supply device 5. In this case, because of the above-described selection of the activation currents, the inlet valve 6a of wheel brake 8 is overflowed and the inlet valves 6b, 6c, 6d of the other wheel brakes 9, 10, 11 remain closed; that is, the valves do not yield to the brake system pressure and do not open. The overflowing takes place by means of volume or position control of the pressure supply device 5. For this purpose, for each wheel brake n, n=8, 9, 10 or 11, a pressure-volume relationship $F^n$ is predetermined, which describes the pressure medium requirement or the pressure medium volume take-up (wheel take-up volume) $V^n$ of wheel brake n as a function of brake pressure $p^n$ ($V^n=F^n(p^5)$). The pressure-volume relationships are stored, for example, in an electronic control and regulation unit. In the example, the wheel take-up volume $V^8$ associated with the reference pressure $p^8_1$ is determined while taking account of the predetermined pressure-volume relationship $F^8$ of wheel brake 8, and the corresponding volume $V_A$ is forced into the wheel brake 8 via the inlet valve 6a by means of the pressure supply device 5. Once the displacement of the pressure medium volume $V_A$ has been carried out or the pressure build-up at wheel brake 8 has taken place, at time $t_2$ the inlet valve 6a of wheel brake 8 is closed firmly, that is, the activation current $I^8$ is raised to the value $I_c$.

A plausibility check of the process can still be carried out via observation of the sensed (by means of pressure sensor 19) brake system pressure P and via the current-pressure calibration data of the inlet valve 6a (brake system pressure=reference wheel brake pressure+reference pressure difference at valve).

Because the brake system pressure P is always higher than all the wheel brake pressures $P^n$, pressure medium volume cannot escape via the non-return valves 50a-50d.

In the example, from time $t_2$ to time $t_3$ a pressure build-up takes place at wheel brake 11 to a predetermined reference pressure $p^{11}_1$. Wheel brake 11 is therefore the single member of a second predefined group $A_2$ of wheel brakes. The inlet valves 6a, 6b, 6c of the wheel brakes 8, 9, 10 which do not belong to group $A_2$ are activated at time $t_2$ (up to time $t_3$) in such a way that the inlet valves 6a, 6b, 6c are closed and cannot be overflowed. The activation currents $I^8$, $I^9$, $I^{10}$ of the wheel brakes which do not belong to the predefined group $A_2$ are therefore set to, or remain set at, a current value $I_c$ which ensures that the inlet valves 6a, 6b, 6c do not yield to the pressure of the pressure supply device and open. The inlet valve 6d of wheel brake 11 of the second predefined group $A_2$ is activated in such a way that the inlet valve 6d is closed but can be overflowed by means of the pressure supply device 5. The activation current $I^8$ is therefore set to a current value $I_2$ which is lower than the value $I_c$. The selection of the current value $I_2$ corresponds to the procedure which was described above for the inlet valve 6a. The pressure build-up in the wheel brake 11 to the predetermined reference pressure value $p^{11}_1$ is carried out by displacement of a pressure medium volume $V_A$ into the predefined group $A_2$, that is, into wheel brake 11, by means of the pressure supply device 5. In this case, because of the selection of the activation currents which has been described, only inlet valve 6d of wheel brake 11 is overflowed. The volume $V_A$ to be displaced is determined, as described above, while taking account of the predefined pressure-volume relationship $F^{11}$ of wheel brake 11 and of the reference pressure $p^{11}{}_1$. From time $t_3$ the inlet valve 6d is again closed firmly (activation current value $I_c$).

In the example, after the pressure build-up has been carried out at wheel brake 11, from time $t_3$ a pressure build-up again takes place at wheel brake 8 to a predetermined reference pressure $p^8{}_2$ by overflowing the inlet valve 6a, etc.

In this manner, in the example, the pressure in the two wheel brakes 8 and 11 is built up sequentially by means of the pressure supply device 5. For one wheel brake at a time a pressure build-up metering is effected by a volume control or position control of the pressure supply device 5 or of the actuator thereof, for a sub-group of wheel brakes having the higher wheel brake pressure reference value. For this whole time the inlet valves 6c, 6d of the wheel brakes 9, 10 having the lower pressure level, at or to which the wheel brake pressure is to be maintained or lowered, are firmly closed (activation current of inlet valves 6b, 6c equals value $I_c$). In wheel brakes 8 and 11a pressure build-up metering takes place by means of multiplex actuator travel control.

In the example, therefore, a pressure build-up is carried out sequentially in different wheel brakes 8, 11, 8, . . . , different individual wheel brakes belonging in successive time intervals to the predefined group $A_1$, $A_2$, $A_3$, . . . , in which a pressure build-up is carried out by overflowing the inlet valve of the wheel brake 8, 11, 8, . . . .

Figure 3:
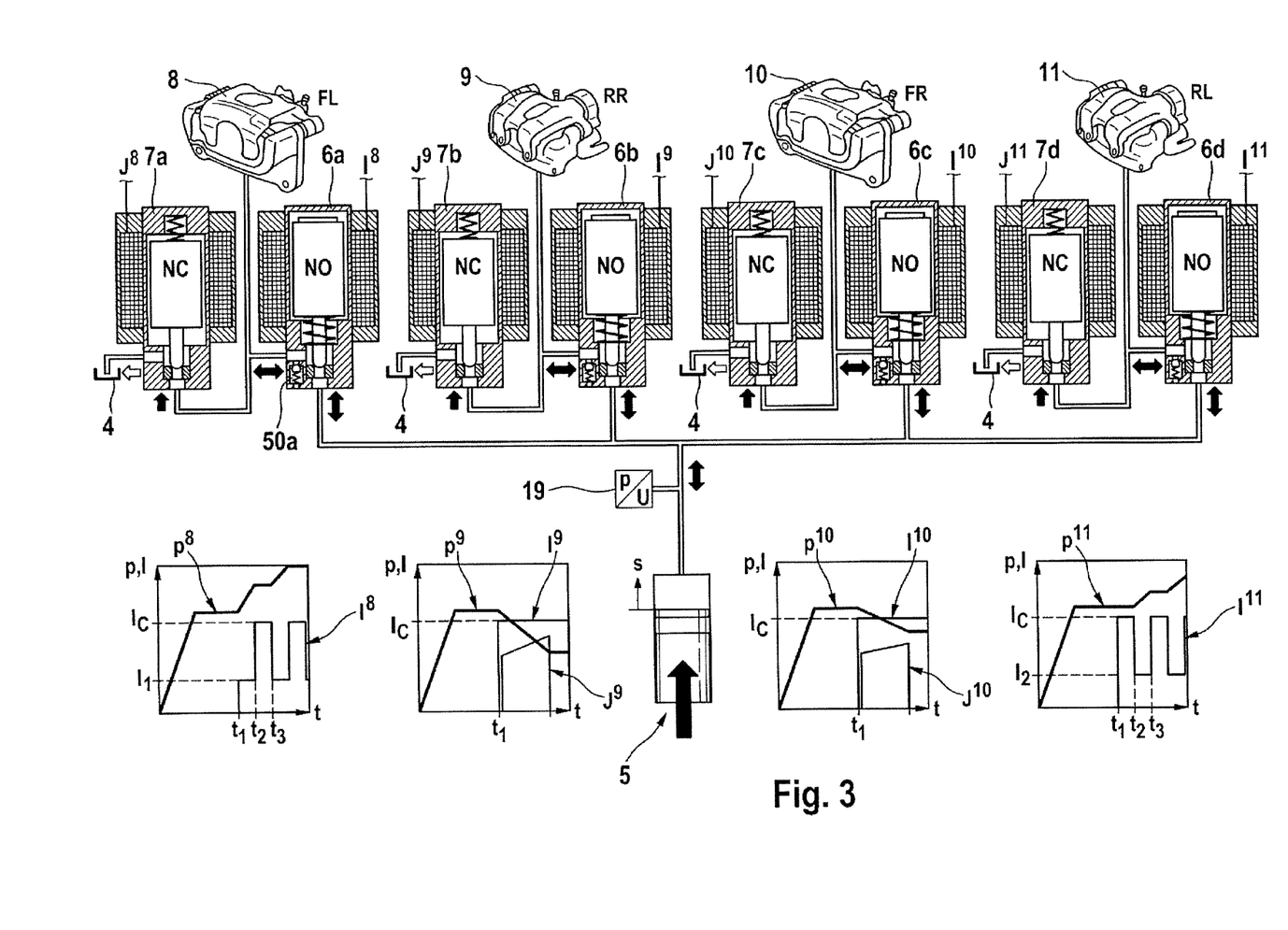
FIG. 3 shows schematically a detail of the exemplary brake system of FIG. 1 to clarify a second exemplary embodiment of a method according to the invention.

FIG. 3, with reference to which a second exemplary embodiment of a method according to the invention will be explained, corresponds very largely to FIG. 2. In deviation from FIG. 2, in the graphs showing the respective time progression of the activation current I of the inlet valves 6a, 6b, 6c, 6d and the wheel brake pressure p of the wheel brakes 8, 9, 10, 11, the time progression of the activation current J of the outlet valves 7b, 7c, denoted by $J^9$ and $J^{10}$, is represented additionally for the wheel brakes 9 and 10. The activation current J of the outlet valves 7a, 7d is zero for the time represented and therefore is not shown in the graphs relating to wheel brakes 8 and 11. The brake pressure curve and the method for building up pressure at the wheel brakes 8 and 11 correspond to those of FIG. 2. In the example, independently of the pressure build-up at the wheel brakes 8, 11, a pressure reduction is carried out at the wheel brakes 9 and 10. The energizing of the inlet valves 6a, 6b, 6c, 6d corresponds to the energizing of the example represented in FIG. 2. For the pressure reduction at the wheel brakes 9 and 10, at time $t_1$ the currentlessly closed outlet valves 7b, 7c are additionally energized, so that the outlet valves 7b, 7c open and pressure medium volume can be discharged into a pressure medium reservoir 4. In the example, the outlet valves are analogized or analog-controlled valves. A pressure build-up metering therefore takes place at the wheel brakes 8, 11 by means of multiplex actuator travel control and a pressure reduction metering takes place at the wheel brakes 9, 10 by means of outlet valve pressure control.

Figure 4:
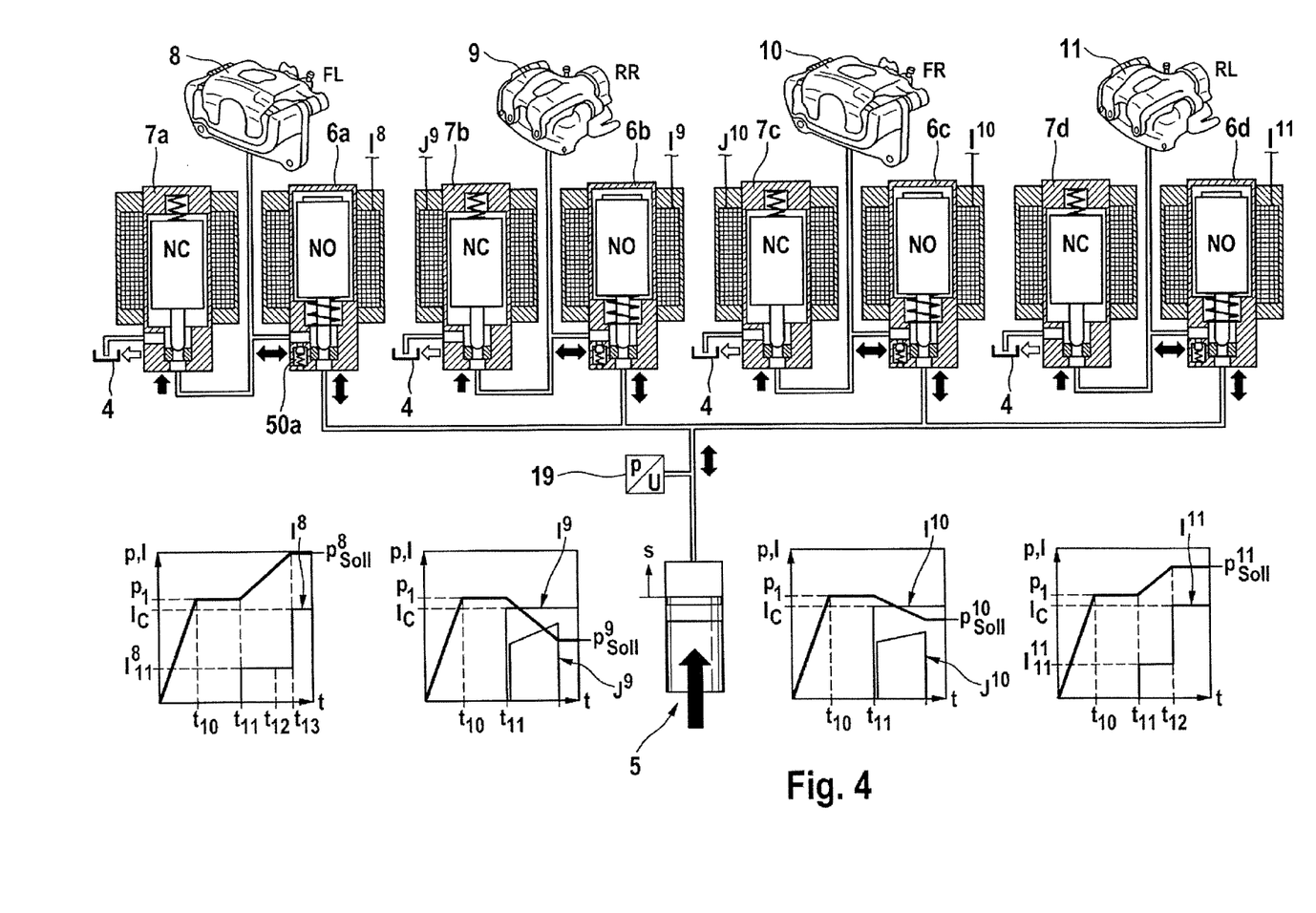
FIG. 4 shows schematically a detail of the exemplary brake system of FIG. 1 to clarify a third exemplary embodiment of a method according to the invention.

FIG. 4 shows schematically a detail of the exemplary brake system of FIG. 1 to clarify a third exemplary embodiment of a method according to the invention. The detail of the brake system corresponds to that in FIG. 2. In FIG. 4, too, graphs showing the respective time progression of the activation quantities (activation currents) $I^8$, $I^9$, $I^{10}$, $I^{11}$ of the inlet valves 6a, 6b, 6c, 6d of the wheel brakes 8, 9, 10, 11, of the wheel brake pressures $p^8$, $p^9$, $p^{10}$, $p^{11}$ of the individual wheel brakes 8, 9, 10, 11 and of the activation quantities (activation currents) $J^9$, $J^{10}$ of the outlet valves 7b, 7c, are shown below the respective wheel brakes 8, 9, 10, 11. From time t=0 to time t=$t_{10}$ the brake pressure in all the wheel brakes 8, 9, 10, 11 is built up jointly and simultaneously from zero to a value $P_1$ by the pressure supply device and then held constant at the pressure level $P_1$ until time t=$t_{11}$. Then a brake pressure build-up to the different reference pressures $p^8{}_{soll}$ and $p^{11}{}_{soll}$ (with to $p^{11}{}_{soll}$<$p^8{}_{soll}$) is to be carried out at wheel brakes 8 and 11, while the pressure in wheel brakes 9 and 10 is to be reduced to different reference pressures.

According to the third exemplary embodiment of a method according to the invention, the pressure build-up at the two wheel brakes 8 and 11 is carried out simultaneously, at least intermittently. First, a simultaneous pressure build-up at wheel brakes 8 and 11 ("active" wheel brakes 8 and 11, or first predefined (selected) group $A_1$ of wheel brakes) is carried out. Then the pressure build-up is continued only at wheel brake 8 ("active" wheel brake 8 or second predefined group $A_2$). In this way the pressure build-up phases of the predefined groups $A_1$, $A_2$, . . . are carried out sequentially here, too.

At the start of the wheel-individual brake pressure control process at time $t_{11}$, all the inlet valves 6a, 6b, 6c, 6d are closed, that is, are activated with an activation current greater than zero. As this happens the inlet valves 6b, 6c of wheel brakes 9, 10, which do not belong to the first predefined group $A_1$, are closed with a high activation current $I^9$, $I^{10}$ of value $I_c$, which ensures that the valves 6b, 6c do not open or are not overflowed. The inlet valves 6a, 6d of the wheel brakes 8, 11 of the first predefined group $A_1$, at which the pressure build-up is to take place simultaneously, are closed with significantly lower activation currents of quantities $I^8{}_{11}$ and $I^{11}{}_{11}$, making it possible for the inlet valves 6a, 6d to be overflowed by means of the pressure supply device 5. As this happens the inlet valves 8 and 11 are supplied with current values representing the same differential pressure (the lowest from the current requirement). The pressure build-up in brakes 8, 11 of the predefined group $A_1$ to the lowest predetermined reference pressure value $p^{11}{}_{soll}$ of the group $A_1$ is carried out by displacement of a pressure medium volume $V_A$ by means of the pressure supply device 5. Because of the above-described selection of the activation currents, the inlet valves 6a, 6d are overflowed and the inlet valves 6b, 6c of the other wheel brakes 10, 11 remain closed, that is, the valves do not yield to the brake system pressure and do not open. The overflowing is effected by means of volume or position control of the pressure supply device 5 with reference to the predefined pressure-volume relationships F''' of the wheel brakes n=8, 9, 10, 11. In the example, the wheel take-up volumes $V^8$ and $V^{11}$ associated with the reference pressure $p^{11}{}_{soll}$ are determined while taking account of the pressure-volume relationships $F^8$ and $F^{11}$ of the wheel brakes 8, 11. The corresponding volume $V_A$=$V^8$+$V^{11}$ is then forced into the wheel brakes 8, 11 via the inlet valves 6a, 6d. This process is carried out until the pressure medium volume required for the wheel brakes of the predefined group $A_1$ together has been made available by the pressure supply device 5. Once the pressure medium volume $V_A$ has been displaced, at time $t_{12}$ the inlet valve 6d of the wheel brake is closed firmly, that is, the activation current $I^{11}$ is increased to the value $I_c$. The desired reference pressure $p^{11}{}_{soll}$ is then reached in wheel brake 11.

A continuation of the pressure build-up then takes place at the wheel brakes of the next predefined group $A_2$, for example at wheel brake 8. In the example, the activation current of the inlet valve 6a therefore remains at the value $I^8{}_{11}$, so that the brake pressure build-up at wheel brake 8 is continued by overflowing the inlet valve 6a by displacement of a corresponding pressure medium volume $V_A$, determined, for example, with reference to the pressure-volume relationship $F^8$ and to the reference pressure $p^8_{soll}$, by means of the pressure supply device. At time $t_{13}$ the pressure medium volume $V_A$ has been displaced and the inlet valve 6a is closed firmly (activation current value $I_c$). The desired reference pressure $p^8_{soll}$ is reached in wheel brake 8.

Corresponding procedures with, for example, a simultaneous pressure build-up first at three wheel brakes, then with a simultaneous pressure build-up at two wheel brakes and then with a pressure build-up at one wheel brake, are carried out analogously. In general, a predefined group comprises one or more wheel brakes.

It is also possible that a simultaneous pressure build-up is first carried out at, for example, three wheel brakes, and the following further pressure build-up is carried out sequentially (and not simultaneously) at two wheel brakes. A mixture of the exemplary procedures of FIGS. 2 and 4 also falls within the meaning of the invention.

For a pressure reduction at wheel brakes 9 and 10 independent of the pressure build-up at wheel brakes 8, 11, the currentlessly closed outlet valves 6b, 6c are energized, that is, the activation current $J^9$, $J^{10}$ is raised from time $t_{11}$, so that the outlet valves 6b, 6c open and pressure medium volume can be discharged into a pressure medium reservoir 4. In the example, therefore, a pressure build-up metering by means of multiplex actuator travel control takes place at wheel brakes 8 and 11, and a pressure reduction metering by means of outlet valve pressure control takes place at wheel brakes 9 and 10.

An advantage of the exemplary method is that the parallel pressure build-up is free of crossflow effects (direct flow from one wheel brake circuit to another), since the pressure of the pressure supply device is always higher. The parallel pressure build-up of the example is therefore more precise than simultaneous pressure adjustments using multiplex valves.

A method according to the invention may be carried out both with a dual-piston or a multi-piston return pump, as known per se from known ESC brake systems. For this purpose the pump is equipped with a so-called pump position sensor. The activation of the activation motor of the pump is configured such that good positionability of the pump eccentric is possible.

Figure 5A:
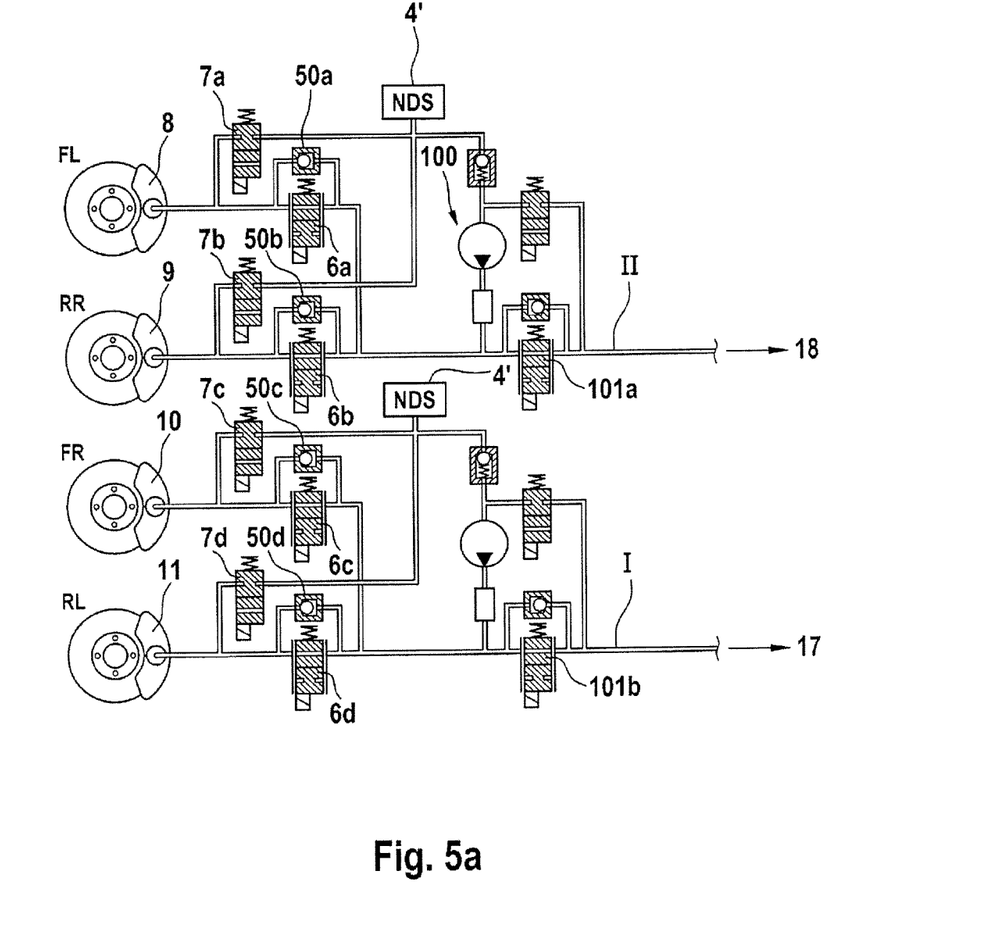
FIG. 5 shows schematically a detail of a further exemplary brake system for carrying out a method according to the invention.

FIG. 5a shows a detail of an ESC brake system known per se. This brake system is also suitable for carrying out a method according to the invention. The detail shows, inter alia, the wheel brakes 8, 9, 10, 11, the inlet valves 6a-6d with non-return valves 50a-50d, the outlet valves 7a-7d, a, for example currentlessly open, respective isolation valve 101a, 101b for each brake circuit I, II which is arranged in the hydraulic connecting line from a pressure chamber 17, 18 of the brake master cylinder 2 (THZ) (not shown) to the inlet valves, and a dual-piston return pump 100 with a pump position sensor 102. The outlet valves 7a-7d are connected on the outlet side to a low-pressure accumulator 4' for each brake circuit I, II.

Figure 5B:
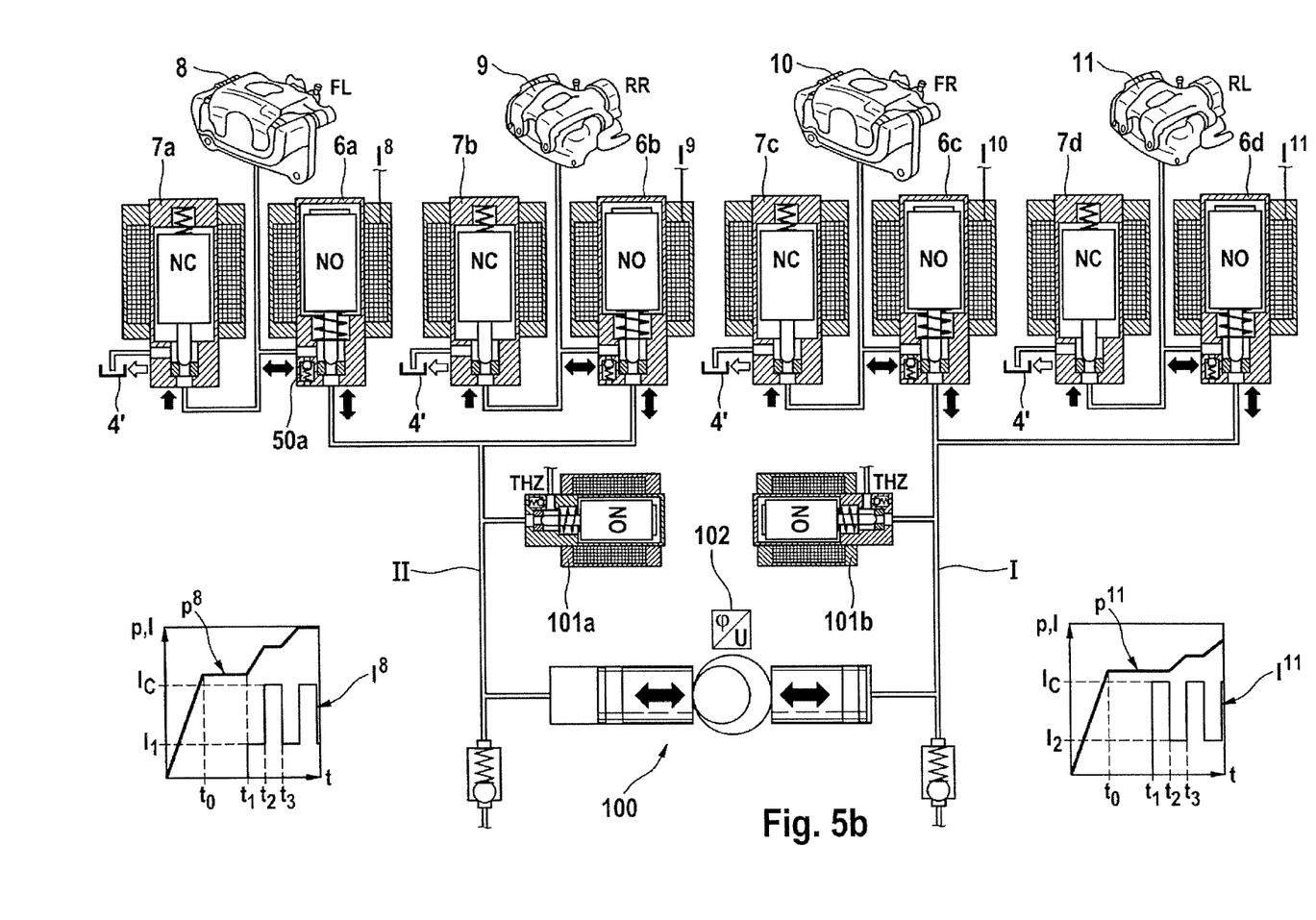

In FIG. 5b graphs showing the respective time progressions of the activation quantity $I^8$ and $I^{11}$ of the inlet valves 6a and 6d, and of the wheel brake pressures $p^8$ and $p^{11}$ of wheel brakes 8 and 11 are represented below the wheel brakes 8 and 11. The graphs for wheel brakes 9 and 10 have been omitted for greater clarity. The brake pressure curve and the method for building up pressure at wheel brakes 8 and 11 correspond to the procedure described with reference to FIG. 2. Accordingly, the energization of the inlet valves 6a, 6d (as well as the energization of the inlet valves 6b, 6c not shown) corresponds to the energization of the example represented in FIG. 2.

As the two brake circuits I and II are positively coupled kinematically by hydraulic means, during a pressure build-up in one of the brake circuits an undesired pressure build-up in the "other" brake circuit can be avoided by subjecting the isolation valve 101 of this circuit to a small closing current while the inlet valves are held shut by full energization.

With known brake systems in which pressure modulation is carried out by means of a high-dynamic pressure supply device with an actuator and wheel-individual multiplex valves, the wheel-individual pressure adjustment at the individual wheel brakes is carried out sequentially in such a way that the multiplex valve associated with the individual wheel brake is fully opened. Pressure equality between the wheel brake and the pressure supply device is therefore established and the pressure adjustment is effected by means of actuator adjustment (forward or return stroke). In this case either the pressure sensor associated with the pressure supply device is used directly for the pressure adjustment or, for example in the case of very rapid processes, the volume change back-calculated from the volume uptake characteristic (position control loop of the actuator) is used. This multiplex method has the disadvantage that, in the case of a comfort-oriented (that is, slow) wheel-individual four-wheel control process, significant inherent noise problems, so-called NVH (Noise Vibration Harshness) problems, arise. The causes of the noise generation lie essentially in the fact that the actuator has to set four different pressures individually (successively) at very high frequency, since otherwise over-large steps in the pressure curve would detrimentally affect braking behavior. This high frequency requires very rapid reversing processes of the actuator which, firstly, must be achievable by the actuator (high costs for the actuator) and, secondly, lead to the noise generation associated therewith. Furthermore, the multiplex valves have to be (completely) opened and (completely) closed in rapid succession at very high speed. This is necessary since it is only the rapid actuation of the valves which makes possible the high multiplex frequency. This leads to correspondingly loud impact noises inside the valves which are propagated to the vehicle bulkhead via the total unit. In addition, the pressure medium columns in the brake lines are accelerated and braked extremely rapidly. The known noise effects are produced by the inductivity of the pressure medium.

The invention makes possible a finely-metered control of the brake pressures of the wheel brakes at the same time as a noise generation as low as possible. An advantage of the method according to the invention is that the actuator of the pressure supply device does not have to reverse during a wheel-individual pressure build-up so that the noise generation associated therewith is already prevented. The frequent switching-on and switching-off processes (closing and opening processes) of the inlet valves are also eliminated. The inlet valves are continuously closed during the pressure adjustments and are only overflowed, sharply reducing the impact noises (no impact on the rear stop, slow and gentle closing (small current excess) at the end of the pressure build-up). Because of the significantly lower frequency, the maximum anticipated pressure gradient is also smaller, significantly reducing noise effects caused by the inductivity of the pressure medium ("pressure shocks").

A further advantage of the method according to the invention is that pressure reduction requirements can be met entirely independently, at the same time, via the outlet valves 7a-7d (see e.g. FIGS. 3 and 4).

The invention claimed is:

1. A method for operating a brake system for motor vehicles, the brake system comprising:
a plurality of wheel brakes for which wheel-individual reference pressures ($p''_{soll}$) are predetermined,
an electrically controllable pressure supply device which is configured to deliver a pressure medium volume (V) for actuating the wheel brakes, the pressure medium volume delivered by the pressure supply device being determinable, and
for each wheel brake an analogized or analog-controlled inlet valve arranged between the pressure supply device and the wheel brake, which inlet valve is activated by an electrical activation quantity ($I''$) and an electrically activatable outlet valve, for setting wheel-individual brake pressures ($p''$), a respective non-return valve which opens in the direction of the pressure supply device being connected in parallel with the inlet valves,
wherein the method comprises:
predetermining a pressure-volume relationship ($F''$) for each wheel brake;
at the start of a wheel-individual brake pressure control process, closing all the inlet valves; and
carrying out a pressure build-up in a predefined group of one or more wheel brakes by displacing a pressure medium volume ($V_A$) into the predefined group of wheel brakes by the pressure supply device by activating each inlet valve of the one or more wheel brakes of the predefined group in such a way that the inlet valve is forced open by the pressure medium volume, and activating each inlet valve of the remaining wheel brakes in such a way that the inlet valve remains closed.

2. The method as claimed in claim 1, wherein the pressure medium volume ($V_A$) to be displaced by the pressure supply device is determined with reference to the pressure-volume relationship or relationships ($F''$) and to the reference pressure or pressures ($p''_{soll}$) of the one or more wheel brakes of the predefined group.

3. The method as claimed in claim 1, wherein the displacement of the pressure medium volume ($V_A$) is effected by a volume control or travel control of the pressure supply device, while taking account of the pressure-volume relationship or relationships ($F''$) and of the reference pressure or pressures ($p''_{soll}$) of the one or more wheel brakes of the predefined group.

4. The method as claimed in claim 1, wherein a pressure build-up is carried out sequentially in different groups of one or more wheel brakes, different groups of one or more wheel brakes belonging to the predefined group in successive time intervals and a pressure build-up being carried out by overflowing the inlet valves of the wheel brakes of the respective predefined group.

5. The method as claimed in claim 1, wherein for each inlet valve an opening characteristic curve and a closing characteristic curve describing a dependence of the electrical activation quantity ($I''$) on a differential pressure ($\Delta p$) or pressure (p) acting on the inlet valve, is predetermined.

6. The method as claimed in claim 1, wherein if the pressure at the one or more wheel brakes of the predefined group is to be built up to a predetermined final pressure, the one or more inlet valves of these wheel brakes is/are each activated with an activation quantity the value of which has at least a threshold value ($I_{grenz}$) which corresponds to the differential pressure between the predetermined final pressure and a lowest pressure of the remaining wheel brakes.

7. The method as claimed in claim 6, wherein for each inlet valve a threshold value corresponding to the differential pressure is determined from a predefined activation characteristic, from a closing characteristic curve, of the inlet valve.

8. The method as claimed in claim 6, wherein the activation quantity exceeds the respective threshold value ($I_{grenz}$) by not more than a predetermined amount ($\Delta I$).

9. A method for operating a brake system for motor vehicles, the brake system comprising:
a plurality of wheel brakes for which wheel-individual reference pressures ($p''_{soll}$) are predetermined,
an electrically controllable pressure supply device which is configured to deliver a pressure medium volume (V) for actuating the wheel brakes, the pressure medium volume delivered by the pressure supply device being determinable, and
for each wheel brake an analogized or analog-controlled inlet valve arranged between the pressure supply device and the wheel brake, which inlet valve is activated by an electrical activation quantity ($I''$) and an electrically activatable outlet valve, for setting wheel-individual brake pressures ($p''$), a respective non-return valve which opens in the direction of the pressure supply device being connected in parallel with the inlet valves,
wherein the method comprises:
predetermining a pressure-volume relationship ($F''$) for each wheel brake;
at the start of a wheel-individual brake pressure control process, closing all the inlet valves; and
carrying out a pressure build-up in a predefined group of one or more wheel brakes by displacing a pressure medium volume ($V_A$) into the predefined group of wheel brakes by the pressure supply device by activating each inlet valve of the one or more wheel brakes of the predefined group in such a way that the inlet valve is overflowed, and activating each inlet valve of the remaining wheel brakes in such a way that the inlet valve remains closed,
wherein in order to carry out a pressure build-up to different, wheel-individual reference pressures in a group of two or more predetermined wheel brakes, all the predetermined wheel brakes are first allocated to the predefined group and a simultaneous pressure build-up to a lowest reference pressure of the reference pressures of the predetermined wheel brakes is carried out by overflowing the inlet valves of the wheel brakes of the predefined group.

10. The method as claimed in claim 9, wherein after a predefined pressure medium volume has been displaced into the predefined group, each inlet valve of the wheel brakes of the predefined group the reference pressure of which corresponds to the lowest reference pressure is activated in such a way that the inlet valve is no longer overflowed.

11. The method as claimed in claim 10, wherein the predetermined wheel brakes having a reference pressure which is higher than the lowest reference pressure are allocated to the predefined group, and in this predefined group a pressure build-up to the next-higher reference pressure is carried out by overflowing the inlet valves of the wheel brakes.

12. The method as claimed in claim 1, wherein the brake system pressure (P) made available by the pressure supply device is determined and is used for monitoring the pressure build-up.

13. The method as claimed in claim 1, wherein the brake system pressure (P) made available by the pressure supply device is at all times higher than the highest pressure in any one of the wheel brakes.

14. A brake system for motor vehicles, comprising:

a plurality of wheel brakes, an electrically controllable pressure supply device which is configured to deliver a pressure medium volume (V) for actuating the wheel brakes, the pressure medium volume (V) delivered by the pressure supply device being determinable, a brake master cylinder which is actuable by a brake pedal and which is connected disconnectably to the wheel brakes, for each wheel brake an analogized or analog-controlled inlet valve arranged between the pressure supply device and the wheel brake, which inlet valve is activated by an electrical activation quantity ($I''$) and an electrically activatable outlet valve, a respective non-return valve which opens in the direction of the pressure supply device being connected in parallel with the inlet valves, and an electronic control and regulation unit for activating the pressure supply device and the inlet and outlet valves, wherein the electronic control and regulation unit is configured to perform the following steps:

predetermining a pressure-volume relationship ($F''$) for each wheel brake;

at the start of a wheel-individual brake pressure control process, closing all the inlet valves; and carrying out a pressure build-up in a predefined group of one or more wheel brakes by displacing a pressure medium volume ($V_A$) into the predefined group of wheel brakes by the pressure supply device by activating each inlet valve of the one or more wheel brakes of the predefined group in such a way that the inlet valve is forced open by the pressure medium volume, and activating each inlet valve of the remaining wheel brakes in such a way that the inlet valve remains closed.

* * * * *